(12) United States Patent
Ager et al.

(10) Patent No.: US 10,227,246 B2
(45) Date of Patent: Mar. 12, 2019

(54) METHOD FOR THE TREATMENT OF INDUSTRIAL WASTE

(75) Inventors: Duane Ager, Yarnton (GB); Timothy Goodall, Yarnton (GB); William Pope, Yarnton (GB)

(73) Assignee: FORD MOTOR COMPANY LIMITED, Dearborn, MI (US)

( * ) Notice: Subject to any disclaimer, the term of this patent is extended or adjusted under 35 U.S.C. 154(b) by 0 days.

(21) Appl. No.: 13/591,695

(22) Filed: Aug. 22, 2012

(65) Prior Publication Data

US 2013/0068688 A1 Mar. 21, 2013

Related U.S. Application Data

(63) Continuation-in-part of application No. PCT/GB2011/000255, filed on Feb. 24, 2011.

(30) Foreign Application Priority Data

Feb. 25, 2010 (GB) .................................. 1003200.1

(51) Int. Cl.
*C02F 3/10* (2006.01)
*C02F 3/34* (2006.01)
*C02F 103/16* (2006.01)

(52) U.S. Cl.
CPC ............... *C02F 3/109* (2013.01); *C02F 3/10* (2013.01); *C02F 3/103* (2013.01); *C02F 3/348* (2013.01); *C02F 2103/16* (2013.01); *Y02W 10/15* (2015.05)

(58) Field of Classification Search
CPC .... C02F 3/00; C02F 3/348; C02F 3/34; C02F 3/341; C02F 3/2806; C02F 2003/001; C02F 2103/16; C02F 2203/00

USPC ......................................... 210/614, 617, 615
See application file for complete search history.

(56) References Cited

U.S. PATENT DOCUMENTS

| 5,595,893 A | * | 1/1997 | Pometto et al. ............... 435/136 |
| 5,681,471 A | * | 10/1997 | Silverstein ..................... 210/614 |
| 7,794,598 B2 | | 9/2010 | Zaitsev |
| 8,703,475 B2 | | 4/2014 | van der Gast et al. |

(Continued)

FOREIGN PATENT DOCUMENTS

| RU | 2377190 | 12/2009 |
| WO | 01/04060 A2 | 1/2001 |

(Continued)

OTHER PUBLICATIONS

M. Perez, et al., Performance of Anaerobic Thermophilic Fluidized Bed in the Treatment of Cutting-Oil Wastewater, Bioresource Technology (2007) vol. 98, p. 3456-3463.

(Continued)

*Primary Examiner* — Claire A Norris
(74) *Attorney, Agent, or Firm* — Andrew Hilton; MacMillan, Sobanski & Todd, LLC

(57) ABSTRACT

There is provided a method for treating spent metal working fluid (MWF), comprising the steps of: (a) providing a biofilm of microorganisms on a solid support matrix in a first bioreactor; (b) transferring at least a portion of the solid support matrix comprising the biofilm of microorganisms from the first bioreactor into a second bioreactor; and (c) incubating the microorganisms in the second bioreactor to reduce the chemical oxygen demand of the spent MWF contained therein.

18 Claims, 6 Drawing Sheets

(56) References Cited

U.S. PATENT DOCUMENTS

| | | | |
|---|---|---|---|
| 2003/0205523 A1* | 11/2003 | Kroon | C02F 3/1268 210/601 |
| 2007/0205148 A1* | 9/2007 | Jones et al. | 210/601 |
| 2009/0272688 A1 | 11/2009 | Zaitsev | |
| 2010/0227380 A1 | 9/2010 | van der Gast et al. | |

FOREIGN PATENT DOCUMENTS

| | | | |
|---|---|---|---|
| WO | 2008/102131 | | 8/2008 |
| WO | WO 2008/102131 | * | 8/2008 |

OTHER PUBLICATIONS

Australian Office Action dated Sep. 9, 2014, which issued during prosecution of Australian Application No. 2011219575.

Chinese First Office Action dated Aug. 1, 2013, which issued during prosecution of Chinese Application No. 201180020809.5.

Chinese Second Office Action dated Apr. 1, 2014, which issued during prosecution of Chinese Application No. 201180020809.5.

Chinese Decision of Rejection dated Apr. 30, 2015, which issued during prosecution of Chinese Application No. 201180020809.5.

Japanese Office Action dated Dec. 2, 2014, which issued during prosecution of Japanese Application No. 2012-554407.

Russian Office Action dated Jan. 21, 2015, which issued during prosecution of Russian Application No. 2012141021/10(066139).

Russian Decision on Grant dated May 21, 2015, which issued during prosecution of Russian Application No. 2012141021/10(066139).

Xiaole HE et al. "Process for Removing a low concentration of toluene with activation film" Heilongjiang Environmental Journal, 20(4):48-50, Dec. 1996.

M. Perez et al. "Anaerobic thermophilic digestion of cutting oil wastewater: Effect of co-substrate" Biochemical Engineering Journal 29(3):250-257, Jan. 2006.

European Office Action, Application No. EP 11705960.0, dated Dec. 20, 2016.

* cited by examiner

METHOD FOR THE TREATMENT OF INDUSTRIAL WASTE

TECHNICAL FIELD

This invention relates broadly to the field of bioremediation and includes the use of microorganisms in the treatment of industrial waste. In particular the invention relates to the use of microorganisms for the treatment of spent metal working fluid (MWF) so that it may be suitable for sewer discharge or for inactivation and further polishing to enable the water to be recycled.

BACKGROUND ART

MWFs are used as lubricants and coolants in metal cutting and grinding, and in drilling operations in industrial manufacturing, for example in automotive engine, transmission and stamping plants. MWFs come in three types: synthetic, semi-synthetic and oil-based (including mineral, vegetable and animal oils). They are typically formulated to include chemicals that inhibit metal corrosion and inhibit microbial activity (biocides). Over time the MWF degrades as it is used in machining operations and will eventually need to be disposed of. The disposal of spent MWF into the environment is very difficult due to a number of factors, including: (1) the high toxicity of the spent MWF caused by for example, biocides and other chemical components that may be added to improve the performance of the MWF; and (2) the high chemical oxygen demand (COD) of spent MWF.

COD is a measure of how much oxygen would be necessary to oxidise the components of materials—such as waste effluents—and is generally considered to be a measure of the organic content of such materials. Typically, the tolerated level for wastewater COD for disposal to the public sewer in the UK is around 2000 mg/L although this may be a higher or lower number depending on the local conditions and may also be a higher or lower number in different countries. Methods for measuring COD are well known in the art. One exemplary method is described by van der Gast & Thompson (2005) *Biotechnology & Bioengineering* 89, 3 357-366 in which a LASA 100 mobile laboratory photometer is used with COD cuvette test kits. The MWF samples in which COD content is measured are pre-filtered using a 0.2 µm pore-size membrane (Millipore, UK).

Due to the toxic nature and high COD of spent MWF, the discharging of the effluent into the environment is tightly regulated, particularly in the US and Europe.

Traditionally chemical and physical methods—such as ultra-filtration and flash/vacuum evaporation—have been used in the treatment of spent MWFs before their disposal into the environment. However these methods can be energy intensive, difficult to scale up for large volumes and are unable to treat the pollution loads of modern MWFs. One method for dealing with the pollution loads that are not removed by filtration is to follow the chemical or physical step(s) with a biological treatment of the spent MWF.

One method for the treatment of MWFs comprises the biological treatment of MWFs in which micro-organisms are added thereto to digest the unwanted constituents. Such methods of bioremediation of MWFs are often unable to reduce the COD sufficiently without the initial processing thereof—such as filtration or ultra-filtration of the spent MWF (see, for example, van der Gast & Thompson (2005) *Biotechnology & Bioengineering* 89, 3 357-366), which adds considerable time, inconvenience and expense to the biological methods. Other biological methods that have been described to bring about some reduction in COD have utilised a liquid inoculation of microorganisms into a bioreactor, wherein the microorganisms are capable of reducing the COD content of spent MWF. For example, Muszynski & Lebkowska (2005) *Polish Journal of Environmental Studies* 14, 1 p 73-79 and Hila et al. (2005) *Journal of Chemical Technology and Biotechnology* (2005) 80, 641-648 describe the selection and culturing of microorganisms from spent MWF and their subsequent liquid inoculation into a bioreactor. Another biological method that has been described to bring about some reduction in COD is to use stable communities of microorganisms that maintain their composition throughout the treatment process using a defined consortium of microorganisms. In this regard, WO2008/102131 describes the use of a consortium of microorganisms consisting of at least an *Agrobacterium* spp., a *Comamonas* spp., a *Methylobacterium* spp. and a *Microbacterium* spp. for treating spent MWF. The methods described therein utilise a liquid inoculation of the consortium of microorganisms into a bioreactor and the use of ultrafiltrated MWF is also disclosed.

The present inventors have sought to develop methods for significantly reducing the COD content of spent MWF, suitably, on an industrial scale. However, in doing so, they encountered a number of problems. For example, they found that bioreactors established using the methods of the prior art typically require lengthy commissioning times before they are operationally effective for treating the spent MWF. This has serious time and cost implications for treating spent MWF on an industrial scale. By way of further example, they also found that bioreactors established using the methods of the prior art could often show erratic performance with some trials showing that the COD content was somewhat reduced whereas other trials showed poor levels of COD reduction. They also found that the reduction in COD that could be achieved with these methods was not low enough for their needs and so the MWFs would require further downstream treatment before being sent to waste, thereby adding further expense and inconvenience.

The present invention provides improvements in the biological treatment of spent MWFs and aims to overcome the problems associated with the prior art.

SUMMARY OF THE INVENTION

The present invention is based, at least in part, on the surprising finding that inoculating a bioreactor with a solid matrix comprising a biofilm that has been previously grown in a different bioreactor can result in the improved bioremediation of spent MWF. In particular, it has been discovered that this method of 'solid matrix inoculation' can result in a shorter period of time between inoculation and full performance therefore making the bioreactor much more efficient for the high throughput treatment of MWF on an industrial scale. It has also been found that the bioreactor performance is much more consistent between trials.

Thus, according to a first aspect of the present invention, there is provided a method for treating spent MWF, comprising the steps of: (a) providing a biofilm of microorganisms on a solid support matrix in a first bioreactor; (b) transferring at least a portion of the solid support matrix comprising the biofilm of microorganisms from the first bioreactor into a second bioreactor; and (c) incubating the microorganisms in the second bioreactor to reduce the chemical oxygen demand of the spent MWF contained therein.

In one embodiment, the biofilm of microorganisms on the solid support matrix in the first bioreactor is capable of reducing the COD of spent MWF to 2000 mg/L or less prior to being transferred to the second bioreactor.

In one embodiment, the microorganisms in the second bioreactor are able to reduce the COD of the spent MWF to 2000 mg/L or less after about 30 days.

In one embodiment or combinations of the above-mentioned embodiments, the volume of the solid support matrix comprising the biofilm of microorganisms that is transferred from the first bioreactor into the second bioreactor in step (b) is at least about 10% of the volume of the second bioreactor.

In one embodiment or combinations of the above-mentioned embodiments, the remaining volume of the second bioreactor is occupied by a solid support matrix upon which a biofilm of microorganisms is not or is not substantially present.

In one embodiment or combinations of the above-mentioned embodiments, the second bioreactor is initially filled either before or after step (b) with MWF, suitably, diluted MWF, in which the COD thereof is between about 5000 to 10,000 mg/L.

In one embodiment or combinations of the above-mentioned embodiments, the solid support matrix comprises, consists or consists essentially of woven tubes of plastic.

In one embodiment or combinations of the above-mentioned embodiments, the air flow in the first and/or the second bioreactor is between about 250 to 300 liters per minute per 5000 liters of liquid bioreactor volume.

In one embodiment or combinations of the above-mentioned embodiments, the biofilm that is established in step (a) is: (i) derived from an indigenous community of microorganisms isolated from MWF; or (ii) a biofilm derived from a different bioreactor which has been inoculated by transferring at least a portion of a solid support matrix comprising a biofilm of microorganisms, and wherein said bioreactor is able to reduce the COD of spent MWF to 2000 mg/L.

In one embodiment or combinations of the above-mentioned embodiments, when the biofilm is derived from an indigenous community of microorganisms isolated from MWF then the maturation of the first bioreactor will typically take about 70 days or more.

In one embodiment or combinations of the above-mentioned embodiments, when the biofilm derived from a different bioreactor which has been inoculated by transferring at least a portion of a solid support matrix comprising a biofilm of microorganisms, and wherein said different bioreactor is able to reduce the COD of spent MWF to 2000 mg/L, then the maturation of the first bioreactor will typically take about 30 days or less.

In one embodiment or combinations of the above-mentioned embodiments, the effluent from the second bioreactor is used to inoculate one or more further bioreactors, optionally wherein the further bioreactor(s) comprises a solid support matrix which is not substantially colonised by microorganisms.

In one embodiment or combinations of the above-mentioned embodiments, said step is repeated one or more times to inoculate one or more further bioreactors. Thus, further bioreactors can be continuously inoculated using this approach.

In one embodiment or combinations of the above-mentioned embodiments, aeration in the first and/or the second bioreactor is commenced substantially at the same time as the spent MWF is added thereto.

In one embodiment or combinations of the above-mentioned embodiments, said spent MWF is a synthetic MWF.

In one embodiment or combinations of the above-mentioned embodiments, said spent MWF is a semi-synthetic MWF.

In one embodiment or combinations of the above-mentioned embodiments, said spent MWF is an oil-based MWF—such as mineral oil, vegetable oil or animal oil and the like.

In a further aspect, there is provided a bioreactor for treating a MWF comprising: (i) a first solid support matrix comprising a biofilm of microorganisms that is capable of reducing the COD content of MWF, optionally wherein said biofilm has been established in a different bioreactor; (ii) a second solid support matrix, wherein said second solid support matrix is not or is not substantially colonised by a biofilm of microorganisms; and (iii) optionally, spent MWF.

In one embodiment, the biofilm of microorganisms on the first solid support matrix is capable of reducing the COD of spent MWF to 2000 mg/L or less.

In one embodiment or combinations of the above-mentioned embodiments, the volume of the first solid support matrix comprising the biofilm of microorganisms is at least about 10% of the volume of the bioreactor.

In one embodiment or combinations of the above-mentioned embodiments, the remaining volume of the bioreactor is occupied by the second solid support.

In one embodiment or combinations of the above-mentioned embodiments, the spent MWF is diluted spent MWF, preferably with a COD thereof of between about 5000 to 10,000 mg/L.

In one embodiment or combinations of the above-mentioned embodiments, the solid support matrix comprises, consists or consists essentially of woven tubes of plastic.

In one embodiment or combinations of the above-mentioned embodiments, the air flow of the bioreactor when it comprises spent MWF and during use is between about 250 to 300 liters per minute per 5000 liters of liquid bioreactor volume.

In one embodiment or combinations of the above-mentioned embodiments, the biofilm on the first solid support matrix is derived from an indigenous community of microorganisms isolated from spent MWF or is derived from a biofilm that is capable of reducing the COD of spent MWF to 2000 mg/L or less.

In one embodiment or combinations of the above-mentioned embodiments, said bioreactor is reversibly connected to one or more further bioreactors to allow the passage of spent MWF therefrom during use, wherein the spent MWF has a COD of 2000 mg/L or less.

In one embodiment or combinations of the above-mentioned embodiments, said spent MWF is a synthetic MWF.

In one embodiment or combinations of the above-mentioned embodiments, said spent MWF is a semi-synthetic MWF.

In one embodiment or combinations of the above-mentioned embodiments, said spent MWF is an oil-based MWF.

In a further aspect, there is provided the use of the bioreactor for the reduction of the chemical oxygen demand of spent MWF.

In a further aspect, there is provided an apparatus for use as the bioreactor described herein.

In a further aspect, there is provided a method for reducing the chemical oxygen demand of spent MWF, comprising contacting the spent MWF with the bioreactor described herein.

Another aspect relates to a method of treating a MWF, comprising: establishing a dynamic community of microorganisms in a reactor, the microorganisms being obtained from an existing, viable community established in a liquid containing MWF; contacting the MWF with the community of microorganisms in the reactor; and allowing the dynamic microorganism community to metabolise the MWF so as to reduce its chemical oxygen demand; wherein the membership of the community is allowed to develop during the treatment process in response to changes in the fluid being treated.

The step of establishing the community can comprise cultivating a starter community of microorganisms in a MWF environment by inoculating the MWF environment with microorganisms that are capable of metabolising MFWs and have been derived from MWFs. In one embodiment, the starter community of microorganisms comprises a consortium of selected microorganisms. In another embodiment, the starter community of microorganisms comprises an indigenous community of microorganisms isolated from MWFs.

In one embodiment, the MWF can be unprocessed prior to contact with the dynamic community of the microorganisms. Suitably, the MWF is provided in a form having a starting COD of less than 50000 mg/L prior to contact with the dynamic community of microorganisms.

In one embodiment, the dynamic community of microorganisms can be provided in the form of a biofilm on a solid support matrix. In this case, the method can comprise the steps of establishing a biofilm on a solid support matrix, and positioning the solid support matrix in the reactor.

In one embodiment, a sample of the biofilm can be taken and transferred to a second reactor to establish a dynamic community in the second reactor.

In one embodiment, the MWF is maintained in contact with the dynamic community until the chemical oxygen demand is no greater than 2000 mg/L. The MWF can have a residence time in the reactor which is dependant on the starting COD level, the temperature of the MWF, the nature of the components in the MWF, and/or the size of the reactor.

The bioreactor may comprise a vessel in which a batch of MWF is treated until the chemical oxygen demand reaches a predetermined level. Alternatively, the bioreactor can comprise a series of vessels through which a stream of MWF passes.

Another aspect of the invention provides a dynamic community of microorganisms for treating a MWF when obtained from a method according to the first aspect of the invention.

Another aspect of the invention relates to a method, a bioreactor or a dynamic community of microorganisms as described herein and with reference to the accompanying description and drawings.

Further aspects of the invention will be apparent from the following description and the accompanying claims.

SOME ADVANTAGES

The present invention is advantageous because the bioreactors that are established using the solid matrix inoculation method of the present invention can be commissioned more rapidly and reliably than bioreactors established using the methods of the prior art. Thus, by way of example, the bioreactors inoculated in accordance with the present invention can typically be commissioned within 30 days or less, which is faster than commissioning using the liquid inoculation methods of the prior art, which typically take about 70 days or more. Thus, a bioreactor comprising mature biofilm that is able to reduce the COD of spent MWF to 2000 mg/L or less can advantageously be obtained in 30 days or less.

The present invention is also advantageous because the bioreactors that are established using the solid matrix inoculation method of the present invention show a more consistent performance between trials as compared to the erratic performance using the liquid inoculation methods of the prior art. This can be appreciated by comparing FIGS. 3 and 4 which show the erratic performance of the liquid inoculation method with the improved performance of the solid matrix inoculation in at least FIG. 6.

The present invention is also advantageous because the method of solid matrix inoculation can achieve a reduction in COD over a shorter period of time. This reduction makes the present invention much more efficient for the high throughput treatment of MWF on an industrial scale. This can be appreciated from at least FIG. 7.

The present invention is also advantageous because biofilms represent the growth and accumulation of bacterial species over time. This diversity ensures that there is enough functional redundancy within the community to allow proliferation and biofilm formation in variable waste streams.

The present invention is also advantageous because it may be practised on spent MWFs, particularly oil-based spent MWFs, that have not been fractionated or filtered or, preferably, in any other way pre-treated prior to treatment, thereby substantially reducing expense and inconvenience.

DEFINITIONS

Metal Working Fluid

Figure 1:
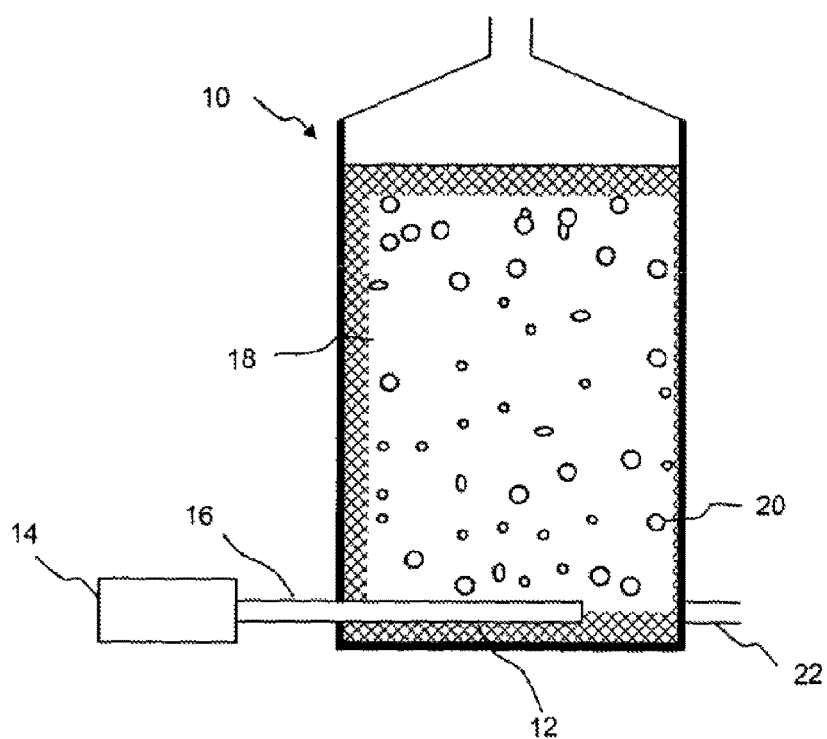
FIG. 1 shows a schematic view of a bioreactor for use in the present invention.

This term refers broadly to a fluid generated during metal processing—such as cutting with an edge tool, turning, drilling, planning and milling, and grinding with abrasive grain such as honing and lapping and the like.

Unprocessed

The term "unprocessed" or "untreated" MWF is used to indicate that the MWF has not been filtered, ultrafiltrated, fractioned or separated by any others means, or been chemically treated or otherwise processed after normal use of the spent MWF in industrial metal working operations, and before the MWF is treated according to the present invention.

Chemical Oxygen Demand (COD)

The term "chemical oxygen demand (COD)" refers to the measure of how much oxygen is necessary to oxidise the components of materials—such as waste effluents—and is generally considered to be a measure of the organic content of such materials. COD is measured in mg/L. The typically tolerated level for wastewater COD in the UK is about 2000 mg/L, although many authorities set lower local limits. It is probable that currently permitted COD levels for sewer discharge will be reduced.

Spent

The term 'spent', as used in with the context of MWFs, indicates a MWF after use in metal processing. MWFs are generally provided as concentrates which are typically diluted to between about 5% to 12% w/v in water prior to use. The methods of the invention are suitable to treat spent unprocessed MWFs.

Biofilm

The term 'biofilm' is used herein to describe a population or a community of micro-organisms that adhere to a surface—such as a solid support matrix—and that, together, are capable of reducing the COD content of spent MWF.

Bioreactor

The term 'bioreactor' is used herein to describe an apparatus adapted to support a solid support matrix to which a biofilm can adhere and to enable the biofilm to be in contact with the spent MWF. Such bioreactors may also be used for the treatment of any other liquid waste susceptible to degradation by the biofilms of the invention, but are primarily intended for the treatment of spent MWFs.

Dynamic

The microorganisms that reduce the COD content of spent MWF may be a dynamic community of microorganisms that changes or has the ability to change its membership (the range of species in the community and their relevant proportions) over time as it metabolises the components of the spent MWF. The proportion of different types of microorganisms making up the community can change over time and/or the types of microorganisms present in the community over time. Within 24 hours of first inoculation, the composition of the dynamic community of microorganisms in the reactor can have changed significantly. In some cases, it may have little similarity to the initial community. The composition of the community can change over the whole duration of a treatment. In one embodiment, less than 5 of the original genera or species of microorganisms from first inoculation remain in the spent MWF after about 1 month, 2 months, 3 months, 4 months, 5 months or 6 months. In another embodiment, less than 4 of the original genera or species of microorganisms from first inoculation remain in the spent MWF after about 1 month, 2 months, 3 months, 4 months, 5 months or 6 months. In another embodiment, less than 3 of the original genera or species of microorganisms from first inoculation remain in the spent MWF after about 1 month, 2 months, 3 months, 4 months, 5 months or 6 months.

DETAILED DESCRIPTION

In one aspect, there is provided a method for treating a MWF, comprising the steps of: (a) providing a biofilm of microorganisms on a solid support matrix in a first bioreactor; (b) transferring at least a portion of the solid support matrix comprising the biofilm of microorganisms from the first bioreactor into a second bioreactor; and (c) incubating the microorganisms in the second bioreactor to reduce the chemical oxygen demand of the MWF contained therein.

The biofilm in step (a) may be sourced from a bioreactor that was originally liquid inoculated with microorganisms, for example, starter microorganisms, that have matured into a biofilm in the presence of a solid support over time and are able to reduce the COD content of spent MWF. Typically, this maturations process will take greater than about 70 days. Once eventually matured, the biofilm should be able to reduce the COD content of spent MWF to the desired level, which is typically about 2000 mg/L or less.

Figure 2:
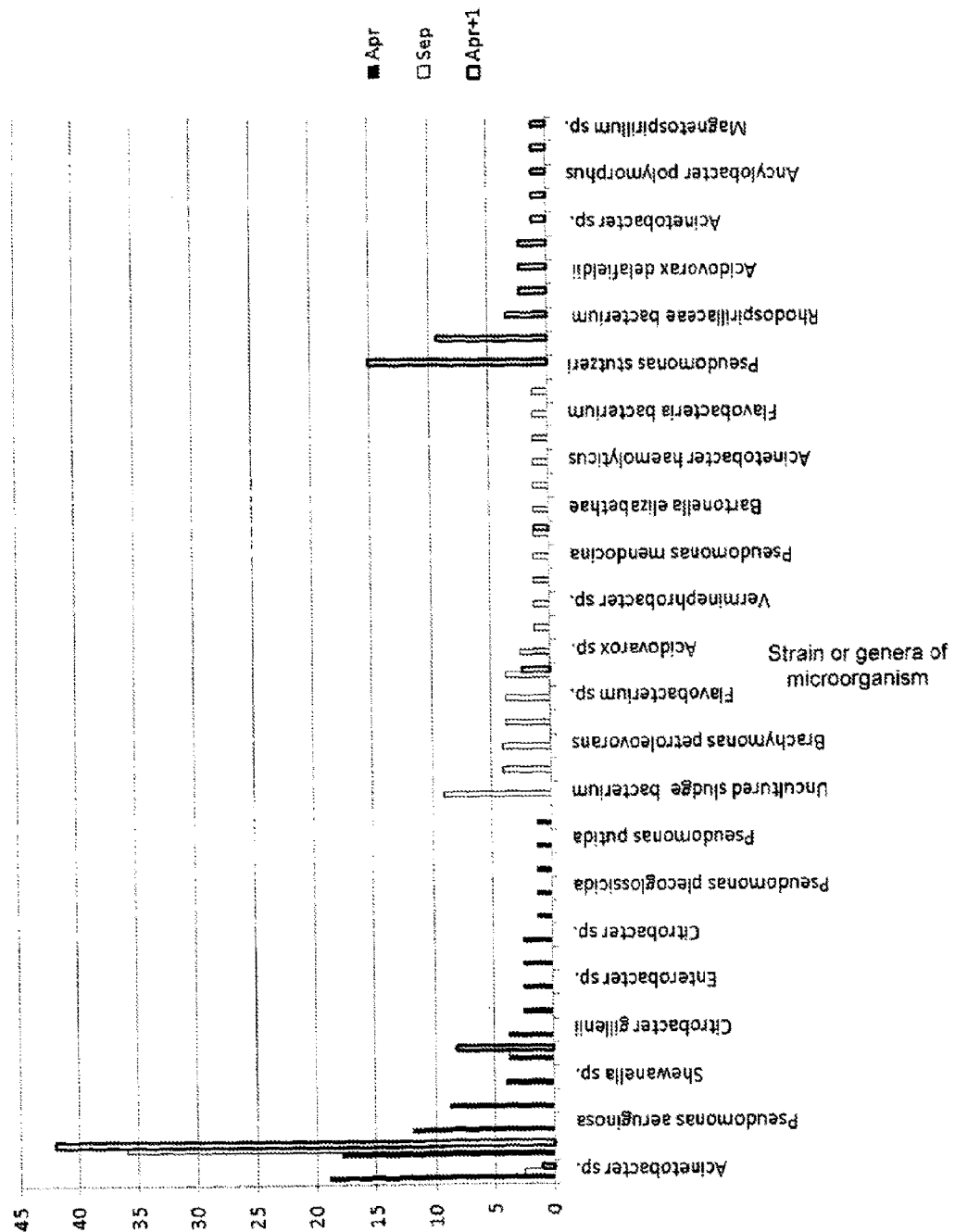
FIG. 2 is a graph illustrating the occurrence of different microorganisms over time in a MWF being treated in a method according to the invention. The x-axis shows the species or genera or bacteria that were detected. The y axis shows the percentage abundance.

The microorganisms may be a single species of microorganisms or a combination or a consortia of two or more microorganisms, provided that they result in a biofilm with the desired properties—such as the ability to reduce the COD content of spent MWF to typically about 2000 mg/L. Such microorganisms may be a consortium of microorganisms as described in WO2008/102131. Such microorganisms may comprise, consist or consist essentially of microorganisms selected from the group consisting of *Agrobacterium* spp., *Comamonas* spp., *Methylobacterium* spp. and *Microbacterium* spp. or a combination of two, three or four thereof. Such microorganisms may comprise, consist or consist essentially of microorganisms selected from the group consisting of those depicted in FIG. 2. Such microorganisms may comprise, consist or consist essentially of microorganisms selected from the group consisting of *Acinetobacter* spp., *Pseudomonas* spp., *Salmonella* spp., *Shewanella* spp., *Citrobacter* spp., *Enterobacter* spp, *Kluyvera* spp, *Parvibacterium* spp., *Brachymonas* spp., *Synergistetes* spp., *Flavobacterium* spp., *Ochrobacterium* spp., *Acidovarux* spp., *Tistrella* spp., *Verminephrobacter* spp., *Bartonella* spp., *Fusobacterium* spp., *Comamonadaceae* spp., *Ancylobacter* spp., *Rhodospirillaceae* spp., *Shewanella* sp., and *Magnetospirillum* spp. or a combination of two or more thereof. As depicted in FIG. 2 different combinations of detectable microorganisms may be present in the bioreactor at different times.

Typically, the microorganisms will coat and adhere to the solid support matrix to form a biofilm without any special conditions being required for the coating and adhesion. As described above, the population of microorganisms that is used to initially form the biofilm may be a defined population of microorganisms. Over time the population dynamics of the microorganisms in the bioreactor will change and develop such that the population may become a substantially unknown population of microorganisms. An understanding of the exact identity of the microorganisms in the biofilm is not always required provided that the biofilm reduces the COD of the spent MWF to the desired level. According to some embodiments of the invention, it is desirable to understand the identify of the microorganisms in the biofilm if, for example, pathogenic microorganisms are to be avoided. According to one embodiment, the microorganisms are mixed with a suitable growth medium when first seeding the bioreactor to form a biofilm. Thus, the microorganisms may be selected from microorganisms that are selected from operational MWFs. By way of example, the microorganisms may be selected on 1/10 tryptic soya broth with the addition of 1-5% MWF or a minimal medium containing MWF or MWF components as the sole carbon source. Such methods are known in the art and have been reported by, for example, van der Gast (2004) *Environmental Microbiology* 6(3) 254-263. Typically, the flasks should be incubated under suitable conditions for the isolates to grow therein—such as at 100 rpm in a shaking incubator for 16 hours at room temperature. If desired, the cultured isolates can be identified by methods that are known in the art—such as DNA sequencing.

Alternatively, the biofilm may be sourced from a bioreactor that has been previously propagated by solid matrix inoculation of a biofilm as described herein. When transferred into the second bioreactor, the second bioreactor will typically mature within about 30 days or less such as within about 25 days, within about 20 days, within about 15 days, within about 10 days, within about 5 days, within about 4 days, within about 3 days, within about 2 days or within about 1 day. Surprisingly, the second bioreactor may even mature more or less immediately and thus be ready for use on the same day as the inoculation.

According to one embodiment, the biofilm that is established in step (a) prior to transfer is able to reduce the COD content of spent MWF to the desired level of about 2000 mg/L or less for greater than about 7 days for a continuous flow bioreactor. According to another embodiment, the biofilm that is established in step (a) prior to transfer is able to reduce the COD content of spent MWF to the desired level of about 2000 mg/L or less during 2, 3, 4, 5 or 6 or more batch runs when the bioreactor is run in batch mode.

It is preferred that the biofilms are capable of growth on all commercially available MWFs, both when the MWFs have been prepared for use and once spent. It will be appreciated that the biofilms are particularly preferred for use with spent MWFs.

The microorganisms that form the biofilm in the bioreactor may be aerobic and/or anaerobic and may include prokaryotic cells, eukaryotic cells, algae cells, plant cells, yeast cells and/or fungal cells or combinations thereof. At least some of the bacteria may be oligotrophic, heterotrophic and/or enteric.

Once the biofilm has matured in the first bioreactor and is capable of reducing the COD of the spent MWF to the desired level, at least a portion of the solid matrix containing biofilm is removed from the first bioreactor and then transferred to a second bioreactor that is to be inoculated. The biofilm may be transferred from the first bioreactor to the second bioreactor immediately or the biofilm may be incubated for a period of time between the transfer. The incubation time and conditions will be chosen such that the viability of the biofilm is not substantially altered. According to one embodiment, the volume of the solid-matrix that is transferred between the bioreactors is approximately at least about 0.5%, 1%, 2%, 3%, 4%, 5%, 6%, 7%, 8%, 9%, 10%, 15% or 20% or more of the volume of the second bioreactor. In one embodiment, the volume of solid-matrix that is transferred is approximately at least about 5% or at least about 10% of the volume of the bioreactor to be inoculated. Thus, for example, 500 ml of solid-support matrix is introduced into a 5 liter lab bioreactor or 1000 liters of solid-support matrix is introduced into a 10,000 liter site reactor. Suitably, the remaining volume of the second bioreactor is occupied by solid-support matrix which does not have a biofilm of microorganisms thereon. Accordingly, the remaining volume of the bioreactor is occupied by solid support matrix that is free or substantially free of microorganisms. Thus, for example, the solid support matrix may be a new solid support matrix or it may be a cleaned solid support matrix upon which the amount of micro-organism growth is substantially absent. Suitably the solid support matrix of the second bioreactor may therefore comprise at least about 50%, 60%, 70%, 80%, 90%, 95% or 100% of the remaining volume of the second bioreactor. The second bioreactor may not include any spent MWF at the time of transfer. Alternatively, the second bioreactor may already comprise the spent MWF prior to transfer or at least a portion of the spent MWF prior to transfer. Operating conditions in the second bioreactor are such that the solid support matrix in the second bioreactor becomes colonised by microorganisms to become covered with a biofilm over a period of days or weeks, preferably days, depending on, for example, the toxicity of the waste stream and the method of inoculation. Thus, for example, if the second bioreactor is liquid inoculated then typical maturation times are typically about 70 days or more; if the second bioreactor is solid matrix inoculated then maturation times are typically about 30 days or less, as discussed herein.

Suitably, the matured biofilm comprises anaerobic pockets. The anaerobic pockets may be occupied by anaerobic microorganisms.

During the early commissioning period of the first and/or second bioreactors, the bioreactors should desirably be fed dilute spent MWF of between about 5000 to about 10,000 mg/L COD. Spent MWF with a higher COD may also be used—such as spent MWF of between about 5000 to about 20,000 mg/L COD, of between about 5000 to about 30,000 mg/L COD, of between about 5000 to about 40,000 mg/L COD or between about 5000 to about 50,000 mg/L COD. Suitably, the spent MWF that is added to the bioreactor(s) is diluted in order to reach this desired COD level. This is to minimise the toxic shock imposed by toxic components that may be present in the waste stream—such as biocides. According to one embodiment of the invention, the first and/or second bioreactors may be supplemented with a growth supplement—such as tryptic soya broth or a trace element solution (for example, a seaweed based trace element solution) and the like to help to establish the growth of the microorganisms into a biofilm in the bioreactor(s). Typically, this supplementation occurs at low levels—such as at about 1 to 10 µl per liter of bioreactor volume.

The COD level of the spent MWF can be increased as the microorganisms present in the biofilm become accustomed to the increasing toxicity of the waste stream.

As the biofilm on the solid matrix support in the bioreactor grows, it will spread and grow to cover any remaining solid support that has not been populated by the biofilm. The biofilm may also cover other available surfaces within the bioreactor. Biofilm may also slough dead and active cells into the liquid MWF. When removed the suspended biomass typically represents between about 500 mg/L to 1500 mgl/L of COD.

Suitably, the aeration in the first and/or second bioreactor is commenced immediately following inoculation or transfer to avoid excessive anaerobic activity and hydrogen sulphide production therein. Bioreactors are typically aerated using air from a compressor and injecting it into pipes typically located at the bottom of the bioreactor to distribute it. The action of the bubbles rising may provide agitation at the bioreactor surface but should not be so violent as to dislodge biofilm that is attached to the solid support matrix. In one embodiment, this gives an air flow of 250-300 liters per minute per 5000 liters of reactor volume. Dissolved oxygen levels are typically around 10 g/l at the start of the commissioning process due to the low cell density. At maturity, measurable dissolved oxygen can be lower at less than about 1 mg/L due to the microorganism utilisation of free oxygen in the bioreactor to metabolise (for example, oxidise) the components of the spent MWF. Significant anaerobic areas may also exist in the bioreactors which can provide an environment for nitrification. However it is generally desirable to minimise anaerobic activity in the bioreactor(s) as this leads to foul odours, most notably hydrogen sulphide which may be generated by sulphate reducing microorganisms metabolising sulphonated surfactants and the sulphur present in spent MWF—such as the mineral oil component thereof.

In one embodiment, the first and/or second bioreactor is commissioned on spent MWF from the same source that it is intended to treat.

The first and/or second bioreactors can be commissioned at various temperatures—such as room temperature (which is typically about 18 to 20° C.) although lower temperatures are possible—such as temperatures as low as 12° C. Once the bioreactor(s) have matured and are able to reduce the COD content spent MWF to the desired level then temperatures of between about 1° C. to about 35° C. can be used. The operating temperature may exceptionally fall outside of this range, depending on the microorganism composition of the biofilm. Suitably, a temperature of between about 25° C. to about 35° C. is used; more suitably, a temperature of between about 26° C. to about 34° C. is used; more suitably, a temperature of between about 26° C. to about 33° C. is used; more suitably, a temperature of between about 26° C. to about 31° C. is used; more suitably, a temperature of between about 26° C. to about 30° C. is used; more suitably, a temperature of between about 27° C. to about 29° C. is used; most suitably, a temperature of about 28° C. is used. This temperature typically allows the COD reduction to be sustained at a high level for several days.

The methods of the present invention can be performed over a range of pHs, which are suitably between about pH 6.0 and about pH 9.5. MWFs are designed with a pH that is quite high, typically pH 9.0 to prevent corrosion of the metal work-piece during machining. The methods are typically optimised at about a neutral pH, with a pH of between about 6.0 and about 7.0, inclusive, being preferable. Advantageously, it has been found that the activity of the biofilm in the bioreactor can reduce the initial pH of spent MWF which in itself can increase the efficiency of the process in the bioreactor.

Accordingly, the methods described herein will generally be carried out for a time and under conditions such that the COD is reduced to the desired level. The amount of time will depend on such parameters as the nature of the MWF, the starting COD level, the temperature, the pH and the method used to inoculate the first and second bioreactors. Thus, in the second bioreactor, it will typically take between about 5 and 15 days for the COD content to be reduced to the desired level; suitably, between about 5 and 14 days, suitably, between about 5 and 13 days; suitably, between about 5 and 12 days; suitably, between about 5 and 11 days, suitably, between about 5 and 10 days, suitably, between about 5 and 9 days, suitably, between about 5 and 8 days, suitably, between about 5 and 7 days, suitably, between about 5 and 6 days. In the second bioreactor, it will more typically take less than about 15 days, 14 days, 13 days, 12 days, 11 days, 10 days, 9 days, 8 days, 7 days, 6 days or 5 days for the COD content to be reduced to the desired level.

As discussed herein, it may be desirable to dilute or initially dilute the MWF to assist in a more rapid reduction of the COD of the spent MWF. For continuous flow bioreactors and/or for batch bioreactors it may be desirable to dilute the COD to achieve a 24 h waste-stream residence time in the reactor. This may sometimes require a dilution to 5000 mg/L influent COD or less.

After treatment in the first and/or second bioreactor, the spent MWF will typically have a COD content of less than about 3000 mg/L, more suitably, less than about 2500 mg/L, more suitably, less than about 2000 mg/L, or more suitably, less than about 1500 mg/L.

It will be appreciated that the methods of the present invention can be used for the treatment of any MWF, particularly an untreated or unprocessed MWF and more particularly an unfiltered MWF or any other industrial effluent of a similar nature—such as re-emulsified sludge originally produced during the storage of coolants. The methods may be particularly suitable for the treatment of untreated oil-based MWFs. In one embodiment, the bioreactor(s) are used to treat oil-based MWFs, particularly an untreated and more particularly an unfiltered, oil-based MWF.

In an advantageous embodiment of the present invention, the effluent from the second bioreactor can be used to inoculate one or more further bioreactors. It has been discovered that the further bioreactor(s) that are inoculated in this way will be much quicker to mature than the first bioreactor. Typically, the third bioreactor will comprise a solid support matrix which is not substantially colonised by microorganisms so that the effluent that is introduced therein can colonise the solid support matrix. This step can repeated one or more times to inoculate one or more further bioreactors. According to one embodiment, the second bioreactor may be reversibly connected to one or more further bioreactors to allow the passage of spent MWF therefrom. Suitably, the passage of the spent MWF is controllable such that it can be transferred once the COD of the spent MWF in the second bioreactor has reached 2000 mg/L or less. According to another embodiment, the further bioreactors may be manually filled with effluent from the second bioreactor. Suitably, the further bioreactors will also comprise a solid support matrix that is substantially free of microorganisms such that they can be colonised by the spent MWF introduced therein. Suitably, at least about 50%, 60%, 70%, 80%, 90% or 100% of the volume of the further bioreactor(s) will be occupied by the solid support matrix that is substantially free of microorganisms.

The solid support upon which the biofilm is grown in the bioreactor may be fixed to the bioreactor and/or removable from the bioreactor. Suitably, at least a portion of the solid support is removable from the bioreactor to allow the transfer of the solid support between bioreactors. The solid support can be any solid support that is suitable for establishing a biofilm. The solid support may be formed of plastic—such as polypropylene, metal, natural fibers—such as cotton and combinations thereof. The solid support may be formed of and/or include a coating formed of a hydrophobic material, such as polyethylene. Suitably, the material selected to form the solid support does not substantially degrade in the presence of MWF. The solid support may be substantially planar, substantially cylindrical, substantially conical, substantially spherical, substantially rectangular, substantially square, substantially oval shaped, and/or irregularly shaped. Suitably, one or more microorganisms are able to couple to the solid support in a bioreactor to form the biofilm, which is capable of being transferred from one bioreactor to another. Suitably, the microorganisms forming the biofilm cannot substantially slough off the solid support during use. Examples of solid supports include, but are not limited to, a biotower, a rotating biological contactor, rough stones, slats, plastic media, a reticulated foam particle, a microcarrier and/or media particles, diatomaceous earth, silica, alumina, ceramic beads, charcoal, or polymeric or glass beads and the like.

A preferred type of solid support comprises or consists of a plastic net—such as an extruded polyethylene net. Another preferred type of solid support comprises woven tubes of plastic—such as polypropylene—which provide a high surface area for biofilm growth whilst still allowing adequate liquid flow over the biofilm surface. Another preferred type of solid support a roughened surface to increase bacterial adhesion. Another preferred type of solid support comprises a combination of one or more, for example all, of these features.

In another embodiment, the solid support matrix comprises, consists or consists essentially of tubes of plastic—such as woven tubes of plastic (for example, polypropylene). The tubes of plastic may comprise about 200 net tubes, suitably, with an approximate 70 mm diameter in a length of 1 m. Each net tube typically comprises about 30 polyethylene strings with a diameter of about 2-3 mm. The net strings can be welded together so that they form square holes in the tube wall. The size of the holes is about 8 mm×8 mm. These strings give a total area of about 100 $m^2/m^3$ in dry condition. Another format of net tubes comprises about 300 net tubes, suitably, with a diameter of about 50 mm in a length of 1 m. Each net tube typically comprises about 30 polyethylene strings with a diameter of about 2-3 mm. The net strings can be welded together so that they form square holes in the tube wall. The size of the holes is about 4 mm×4 mm. These strings give a total area of about 150 $m^2/m^3$ in dry condition. Another format of net tube has an outer diameter of about 50 mm. Each cubic meter consists of about 300 net tubes with about 50 mm diameter in a length of 1 m. Each net tube comprises about 30 polyethylene strings with a theoretic diameter of about 3-4 mm. The net strings are welded together so that they form square holes in the tube wall. The size of the holes is approx. 3 mm×3 mm. These strings give a total area of about 200 $m^2/m^3$ in dry condition. Solid matrix for use in the present invention is commercially available.

The bioreactors that are described herein may include a controller. A controller may be configured to automate the system. The controller may measure various parameters of the system, such as pressure; temperature; pH; COD content, a wastewater stream, and/or an outlet stream; an amount, type, and/or ratio of types of bacteria in the bioreactor; flow rates, air bubble stream; and/or a volume of water and the like. The controller may use measurements of the various parameters to modify values of one or more parameters of the system. The controller may measure and/or modify parameters of the system continuously or periodically.

The bioreactor may be adapted for batch or continuous operation. The bioreactor may be an aerobic bubble column bioreactor.

In one embodiment, at least a portion of the solid support matrix may be replaced or added to the bioreactor(s) in response to a substantially decreased level of activity of the biofilm—such as a substantially decreased level of COD reduction. The biofilm may be replaced by removing at least a portion of the solid support matrix and then replacing the removed solid support matrix with a solid support matrix from the first bioreactor or a new or cleaned solid support matrix upon which substantially no microorganisms are present. A solid support matrix comprising a mature biofilm may be added to the bioreactor(s) in order to improve the activity thereof.

The bioreactor may be formed of plastic, metal, and/or other materials. The bioreactor may include one or more coatings. The coating may inhibit corrosion and/or facilitate removal of solids from a container. For example, a bioreactor may have a polytetrafluoride coating to inhibit corrosion and to inhibit solids from adhering to the bioreactor. The footprint of the bioreactor may be substantially square, substantially circular, substantially oval, substantially rectangular, and/or irregularly shaped. The bioreactor may have a shape configured to minimise stagnant regions in the bioreactor. In certain embodiments, the shape of the inner surface of the bioreactor may minimize stagnant regions in the container during mixing. The inner surfaces of the bioreactor may be rounded instead of meeting at an edge. For example, the inner surface of the bioreactor may have a shape substantially similar to an oval or a circle to minimize the presence of stagnant regions in the bioreactor, during use. In one embodiment, the bioreactor may have a shape in which substantially all of the liquid in one or more of the bioreactors circulates when mixed with a stirrer during use. The bioreactor may include one or more stirrers to agitate the spent MWF and/or gases in the bioreactor. One or more stirrers may be positioned to reduce dead mixing zones in the bioreactor. For example, the bioreactor with an oval cross-sectional area may include two stirrers approximately equally spaced across a bottom surface to inhibit areas of stagnation in the bioreactor. The bioreactor may include one or more inlets for wastewater streams, air bubble streams, and/or bacteria. The bioreactor may include one or more outlets for removal of liquids and/or solids from the bioreactor. Filters may be coupled to inlets and/or outlets. A filter and or a gravity trap may be coupled to an inlet to remove and/or break apart large solids. A filter may be coupled to an outlet to prevent solids such as waste solids, microorganisms, biofilm, and/or particulate matter from flowing out of the bioreactor. In one embodiment, a filter may inhibit contaminants from water flowing out of the bioreactor. For example, filter paper or an activated carbon filter may be coupled to an outlet to remove contaminants from a stream flowing out of the bioreactor. In certain embodiments, an electrocoagulation system may be coupled to inlets and/or outlets. An electrocoagulation system may be used prior to allowing spent MWF to enter the bioreactor comprising a biofilm and/or after allowing spent MWF to leave the bioreactor that includes a biofilm. The electrocoagulation system may cause compounds to precipitate and float to a top or bottom surface of the bioreactor for removal. In one embodiment, an electrocoagulation system may charge ions in the spent MWF. The charged ions may bind to oppositely charged ions and form a precipitate. Then the precipitates may float to a top surface or sink to a bottom surface of the bioreactor for removal from the spent MWF. In an embodiment the precipitates may be filtered out of the spent MWF.

In one aspect, there is provided a bioreactor for treating a MWF comprising; (i) a first solid support matrix comprising a biofilm of microorganisms that is capable of reducing the COD content of MWF, optionally wherein said biofilm has been established in a different bioreactor; and (ii) a second solid support matrix, wherein said second solid support matrix is not or is not substantially colonised by a biofilm of microorganisms; and (iii) optionally, diluted spent MWF.

Suitably, the first solid support matrix has been previously prepared in the first bioreactor as described herein. Suitably, the biofilm of microorganisms on the first solid support matrix is capable of reducing the COD of spent MWF to about 2000 mg/L COD or less. Suitably, the volume of the first solid support matrix comprising the biofilm of microorganisms is at least about 1%, 2%, 3%, 4%, 5%, 6%, 7%, 8%, 9% or about 10% of the volume of the bioreactor. Suitably, the volume of the first solid support matrix comprising the biofilm of microorganisms is at least about 5% of the volume of the bioreactor. More suitably, the volume of the first solid support matrix comprising the biofilm of microorganisms is at least about 10% of the volume of the bioreactor. Suitably, the remaining volume of the bioreactor is occupied by a solid support matrix upon which a biofilm of microorganisms is not or is not substantially present. Suitably, the first and second support matrixes are moveable in and out of the bioreactor. More suitably, the first support matrix is moveable in and out of the bioreactor and the second support matrix is fixed within the bioreactor.

It will be appreciated that the present invention provides the use of a bioreactor, as defined herein, in the reduction of the COD of spent MWF. The invention further provides apparatus for use as a bioreactor of the present invention and a bacterial preparation suitable to seed said apparatus to provide a bioreactor of the present invention. Further provided is waste liquid treated by a method or bioreactor of the present invention, especially wherein said waste is spent MWF, and more especially where the COD of the waste is about 2000 mg/L or lower.

It may be desirable to preserve microorganisms and/or biofilm comprising the microorganisms from the first and/or second bioreactors for later use. Biofilm may be stored in an aerated bubble column reactor containing phosphate buffered saline or may be fed dilute MWF of between about 1000 mg/L to about 2000 mg/L COD for as long as approximately one year without substantially affecting its capability to return to a growth phase.

In one embodiment, the biofilm and/or the bioreactor contains substantially no pathogens, and suitably no pathogens at all.

Once the desired COD level has been reached, the grey water remaining from the treatment can be released into the sewer or it can be used to inoculate further bioreactors. Grey water may optionally be further treated before release in order to kill any residual microorganisms. Suitable treatments include, but are not limited to ozone, irradiation heat, or any other treatment that does not increase the toxicity of the grey water. At this stage, a new batch of spent MWF can be introduced into the reactor for processing.

A further aspect relates to a process for commissioning a bioreactor for treating a MWF comprising the steps of: (a) providing a biofilm of microorganisms on a solid support matrix in a first bioreactor; (b) transferring the solid support matrix comprising the biofilm into a second bioreactor; (c) filling the second bioreactor with spent MWF either before or after step (b); and (d) providing conditions in the second bioreactor that allow it to become colonised with a biofilm of microorganisms.

A further aspect relates to a commissioned bioreactor obtained or obtainable by said process.

In another aspect, the invention comprises a method for treating a spent MWF. The MWF is contacted with a dynamic community of microorganisms. The microorganisms (bacteria) are allowed to work on the MWF to digest the oil and other components in the MWF. By first contacting the spent unprocessed MWF with a dynamic community of microorganisms over time it is possible to reduce the chemical oxygen demand of spent MWF.

By using a dynamic community of microorganisms according to one embodiment of the invention, that is allowed to change over time, the most suitable community of microorganisms present for a specific period of the processing treatment is allowed to develop. This can allow more efficient processing of the MWF, as the most appropriate microorganisms are present for degrading the constituents in the mixture.

The composition of the MWF will change over time as it is degraded by the microorganisms. Initially oil comprises a large proportion of the MWF being treated, however the oil is used up as it is digested and broken down by the microorganisms and the other components of the MWF are left to be degraded. This changes the environment in the reactor and the microorganisms present in the initial microorganisms are not necessarily the most suitable to degrade the remaining components, or may not have the ability to work in these conditions. The changes in the environment make it more suitable for other microorganisms to proliferate and grow. The continuous changing of the environment in the reactor as the MWF is treated, makes the conditions suitable for an adaptable community of microorganisms to develop over time.

The dynamic community of microorganisms can initially be obtained by creating a group or consortium of microorganisms that are selected for their ability to degrade the components of the MWF, and that have been derived from MWFs, to form a starter community of microorganisms. The group of organisms may comprise one or more different types of microorganisms. It is preferred that the community is formed from different bacterial species or subspecies. Alternatively the dynamic community of microorganism can initially obtained by isolating indigenous bacteria directly from MWF to obtain a starter community of microorganisms. Certain species of bacteria are known to be capable of metabolising the components of MWFs. To form a useful community, such bacteria that have been cultivated in media containing MWFs can be used. This tends to ensure that the bacteria are resistant to biocides and other toxic components of MFWs that might otherwise kill off a strain that has not been exposed to such components.

The starter community of organisms is cultured to obtain the dynamic community used to seed the reactors. Solid inoculation using a standard support is the preferred method for exposing the microorganisms to the MWF. However the community of microorganisms can also be added directly to the MWF to be treated.

The MWF can be processed in a batch reactor or the MWF can be processed by continuous processing through a series of reactors. The MWF is then released into the sewer of for further polishing once the COD has reduced sufficiently to an allowable level. The amount of time needed for the COD to reach the desired levels will depend on parameters such as the starting COD level of the MWF, the temperature of the MWF in the reactor, the nature of the components in the MWF such as coolants, and the size of the reactor.

The MWF can be diluted to reduce the COD of the MWF to a level that can be continuously processed by the reactors, if necessary. For example, a 1:2 dilution, a 1:3 dilution, a 1:4 dilution, a 1:5 dilution, a 1:6 dilution, a 1:7 dilution, a 1:8 dilution, a 1:9 dilution or most suitably, a 1:10 dilution of the starting MWF can be performed to provide a suitable influent COD such that a reduced effluent COD is achieved. The MWF can be diluted to a COD of about 50,000 mg/L or less, about 40,000 mg/L or less, about 30,000 mg/L or less, or about 20,000 mg/L or less before being added to the bioreactor.

The following examples are provided as an illustration and not as a limitation. Unless otherwise indicated, the present invention employs conventional techniques that are well known in the art.

EXAMPLES

Example 1—Solid Inoculation of Microorganisms for Biodegradation of MWF

A starter community of microorganisms is obtained by selecting a group of organisms that are known to be initially capable of metabolizing the constituents of MWF to form artificial community of microorganisms. An example of such a starter community can be obtained, for example, by inoculating with the consortium described in W02008/102131. Alternatively an indigenous community of microorganism is extracted from a spent MWF. The starter community of microorganism is then cultured in an environment comprising MWF to produce an initial dynamic community of microorganisms in the form of a biofilm that can be used to initially seed the bioreactor.

The reactor as exemplified in FIG. 1 can be used for batch processing of the MWF. The reactor 10 comprises an air distributor 12 on the bottom of the reactor connected to a pump 14 via an air inlet tube 16 to provide air 20 to the system. Solid support matrix 18 (for example, a polypropylene web or net structure) is provided in the reactor to provide significant surface area onto which the biofilm can grow. This maximises the biofilm area that the MWF can be exposed to. An outlet tube 22 provides an opening to release the treated MWF from the reactor. A heater may be positioned in the reactor if required.

The reactor is initially set up with the air distributor situated on the bottom of the reactor and with the solid matrix added to the bottom of the reactor. An initial volume of pre-prepared matrix comprising the dynamic community of microorganisms is added to the reactor and the remaining reactor volume is filled with clean matrix. Approximately 10-20% of the total matrix volume can comprise the starter community of dynamic microorganisms. In order to establish a biofilm on the biomedia of the reactor a series of doses (e.g. five doses) of a predetermined volume of diluted MWF is poured into the bioreactor. Dilution of the MWF can help in establishing the community on the support since it reduces the overall oil load of the dose and therefore avoids excessive oil wetting of the support inhibiting community growth. The initial five batches of MWF put into the reactor will have a chemical oxygen demand (COD) that is lower than that of an undiluted MWF, e.g. less than 15,000 mg/L. The MWF content for each of these initial batches can be progressively increased.

Fluid is discharged from the reactor for inactivation once the COD reaches the desired level. During this period the MWF is augmented by the addition of 0.2% w/v Tryptone soya broth. After completion of several cycles of the diluted MWF, a biofilm should have developed throughout the reactor. The reactor is then ready to receive spent MWF having a higher COD for degradation.

The unprocessed MWF is introduced into the reactor and the microorganisms are allowed to act of the MWF until the desired COD level is reached, e.g. below 2000 mg/L. The grey water remaining from the treatment of the MWF can then be released into the environment. The grey water having a COD level of less than 2000 mg/L may be further treated for example by ozone, before it is released into the sewers in order to kill off any residual microorganisms. A new batch of MWF for treating can then be introduced into the reactor.

At the end of the treatment process a sample of biofilm matrix containing the community of microorganisms is collected from the reactor and transferred into another reactor to be used as the starter community. As described above, by using increasing concentrations of MFW, the initial sample of biofilm can be grown into a complete biofilm. The reactor can then be used in another treatment process.

Example 2—Dynamic Community Behaviour in a Batch Bioreactor

A dynamic community of bacteria are contacted with the spent MWF obtained from an engineering plant. The dynamic community of bacteria is initially grown to form a biofilm in the reactor using dilute MWF.

Samples of the biofilm in the reactor were taken at three times intervals, April, September and April+1. The samples are analysed and the microorganisms present and the relative abundance of each microorganism detected in the samples determined. The results are shown in FIG. 2.

Referring to the graph of FIG. 2 the majority of detected bacteria at the beginning of the processing treatment (Apr) are no longer present 12 months later (Apr+1). The only detected bacterium still present 12 months later in are *Acinetobacter* sp. and *Pseudomonas* sp. However the proportions of the *Acinetobacter* sp. and *Pseudomonas* sp. have changed over time. Initially, *Acinetobacter* sp are found to comprise a large percentage of the detected bacteria. While still present 12 months later, *Acinetobacter* sp. form a much smaller percentage of the community of microorganisms present in the MWF. *Acinetobacter* sp is no longer a dominant species present in the MWF after 12 months. *Pseudomonas* sp. is present in the initial and final biofilm, increasing its presence in the community of microorganisms over time.

This shows that there is a change in the type of microorganism and a change in the proportion of microorganisms over time during the processing of the MWF. A large number of microorganisms not present in the initial dynamic community, are present in the biofilm after a time. These can include bacteria present in small quantities in the MWF that have flourished in the reactor.

Example 3—Single Liquid Inoculation Method of a Bioreactor 5 isolates selected on spent MWF were grown in $\frac{1}{10}$ strength tryptic soya broth (TSB) for 16 hours at room temperature. Cell suspensions are used at a rate of 10% (by volume) to inoculate either laboratory or on site reactors. In the laboratory bioreactor 500 ml of inoculum is used per 5 liters and on site 100 liters is used per 1000 liters of MWF waste. This method is described in van der Gast and Thompson (2005). *Biotechnol and Bioeng.*, 89, 3, 357-366.

The spent MWF is added to the bioreactors and the COD level thereof is measured.

Figure 3:
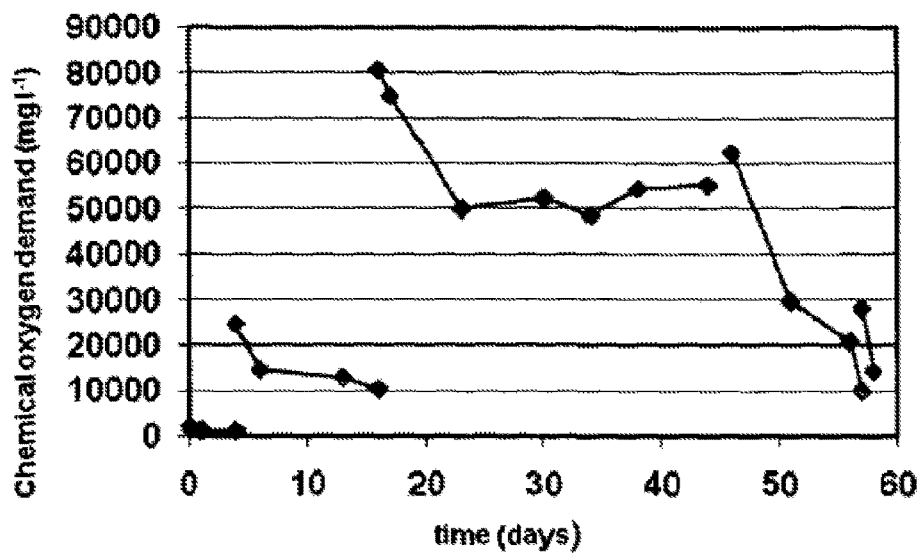
FIG. 3 illustrates the reduction in COD demand of a 5000 liter bioreactor using a single liquid inoculation across 5 different experiments.
Figure 4:
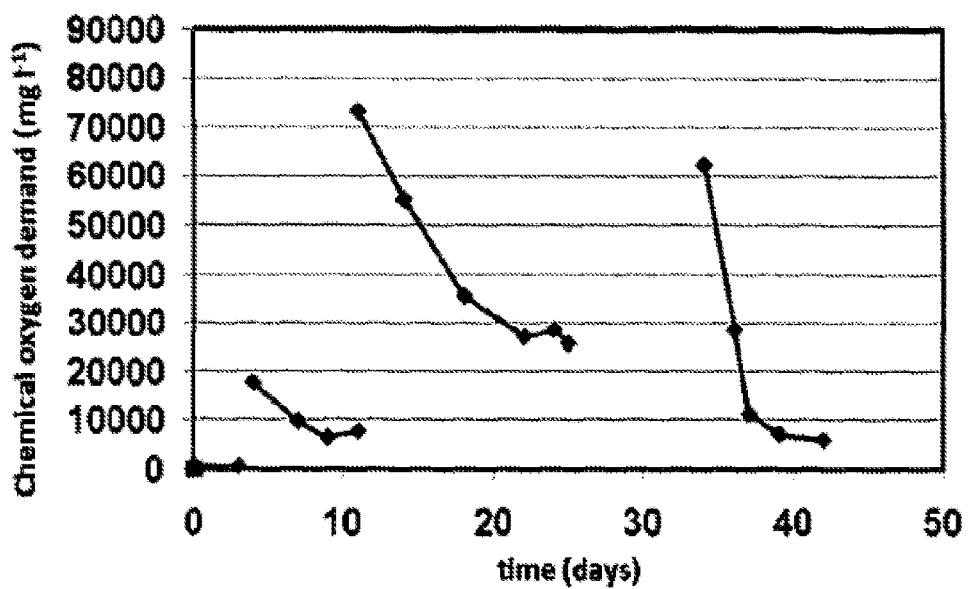
FIG. 4 illustrates the reduction in COD demand of a 5 liter laboratory bioreactor using a single liquid inoculation across 4 different experiments.

The results of these experiments are shown in FIGS. 3 and 4. As can be seen, although the COD level can be decreased, the performance is erratic such that there is great variability in the results that are obtained. Such systems would be difficult to implement on a commercial scale.

Example 4—Multiple Inoculation Method 5 isolates selected on spent MWF are grown in $\frac{1}{10}$ strength tryptic soya broth (TSB) for 16 hours at room temperature. Cell suspensions are used at a rate of 10% (by volume) to inoculate laboratory and on site reactors containing non-biofilmed matrix. Inocula are added to batches 1-9 left to right in FIG. 5.

Figure 5:
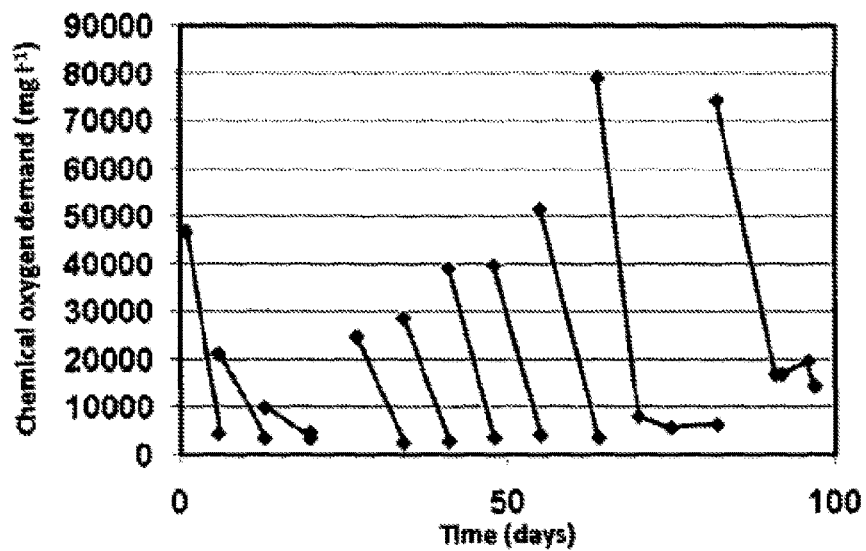
FIG. 5 illustrates the reduction in COD demand of a 5000 liter bioreactor using multiple inoculations across 9 different experiments.

The results of these experiments are shown in FIG. 5 and show that adequate performances can be obtained in inoculated batches. However batch 10, which was not inoculated, did not achieve adequate performance. This indicates that greater than 9 inoculations may be required to establish a fully functioning biofilm.

Example 5—Solid Matrix Inoculation Method

A mature biofilm which has been grown on a solid support matrix is transferred from a first bioreactor into a second bioreactor. The bioreactor from which the biofilm is sourced has been consistently reducing the COD of spent MWF to about 2000 mg 1-1 COD or less for greater than about 1 week for continuous flow or for a minimum of 2 batch runs in batch mode.

The mature biofilm can be sourced from bioreactors that were originally liquid inoculated and have undergone the lengthy maturation process in a laboratory for example, or they can be sourced from a bioreactor previously propagated by solid-matrix-transfer of a mature biofilm.

If culture isolates are used for establishing the biofilm then the inoculum can comprise a bacterial community selected from operational MWFs on $1/10$ tryptic soya broth with the addition 1-5% MWF or a minimal medium containing MWF or MWF components as the sole carbon source (see van der Gast *Env. Micro* (2004) 6(3) 254-263). Flasks are incubated at about 100 rpm in a shaking incubator for about 16 hours. Cultured isolates are identified by DNA sequencing to exclude pathogens from consideration as inocula. Single species or consortia of microorganisms can be used to inoculate bioreactors.

The matrix containing mature biofilm is removed from an operating bioreactor and transferred to the reactor that is to be inoculated. A volume of mature matrix biofilm that is approximately 10% of the volume of the reactor to be inoculated is used (i.e. a 500 ml tube of solid support matrix in a 5 liter bioreactor, 1000 liters into 10000 liter site reactor). The remaining volume of the reactor is occupied by clean (non-biofilmed) matrix. The reactor is then filled with diluted MWF waste and aeration is commenced immediately to avoid anaerobic action and hydrogen sulphide production.

The COD level of the spent MWF is monitored measured.

Figure 6:
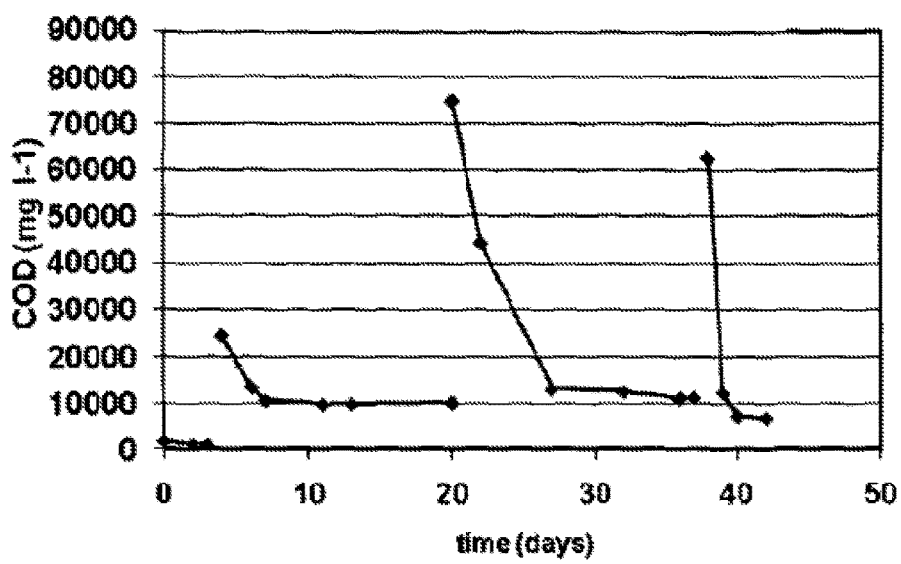
FIG. 6 illustrates the reduction in COD demand of a 5 liter laboratory bioreactor using the solid matrix inoculation method of the present invention.

The non-biofilmed matrix is colonised and covered with biofilm over a period of days or weeks depending on the waste stream. The results of these experiments are shown in FIG. 6. As can be seen, stable and consistent reduction in COD levels are achieved in a bioreactor using the solid matrix method.

Example 6—Bioreactor Commissioning

The bioreactor is commissioned at a temperature of about 18-20° C. although temperatures down to 12° C. can be used. Once mature, the bioreactors are able to tolerate about +1 to +35° C. COD reduction is negligible at 1° C., but operation can be sustained at a high level at 30° C. for several days.

Reactors are aerated using air from a compressor and injecting it into pipes at the bottom of the bioreactor to distribute it. The action of the bubbles rising provides agitation at the bioreactor surface but is not so violent as to dislodge attached biofilm. In practice this gives an air flow of about 250-300 liters per minute per 5000 liters of reactor volume. Dissolved oxygen levels are typically about 10 mg/L at the start of the commissioning process due to the low cell density. At maturity, measurable dissolved oxygen is typically less than 1 mg/L due to microorganism utilisation of free oxygen to oxidise the oils and other MWF components.

Example 7—Bioreactor Feed

During the early commissioning period the liquid inoculum or biofilm inoculated bioreactor is fed dilute MWF waste of between about 5000 to about 10000 mg/L COD to minimise the toxic shock imposed by toxic components of the waste stream—such as biocides. At laboratory scale reactors are sometimes supplemented with tryptic soya broth. This is not practical or cost effective at full scale. At >1000 liter scale we supplement at extremely low levels (1-10 µl per liter of reactor volume) with a seaweed based trace element solution.

Example 8—Comparison of Liquid and Solid Matrix Inoculation in a 5 Liter Laboratory Bioreactor A comparison of liquid and solid matrix inoculation was performed in a 5 liter laboratory bioreactor containing spent MWF. The bioreactors were established using the methods already described herein.

Figure 7:
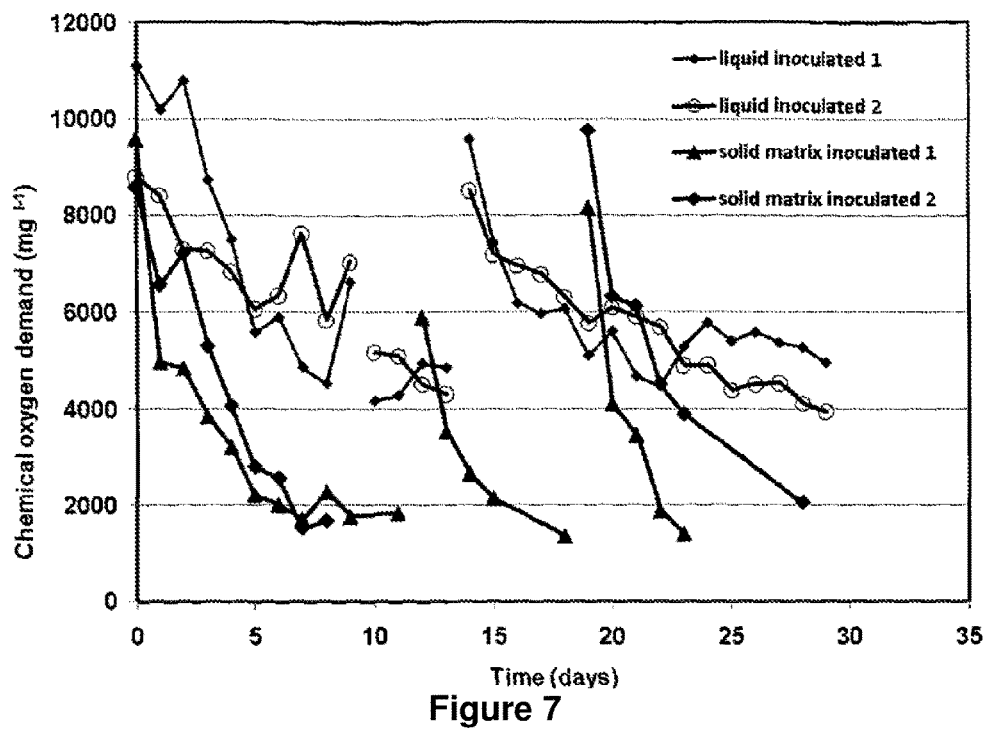
FIG. 7 illustrates the reduction in COD demand of a 5 liter laboratory bioreactor on spent MWF using two repeats of the solid matrix inoculation method of the present invention and comparing this to two repeats of the liquid inoculation method of the prior art.

The results in FIG. 7 show that solid matrix inoculated bioreactors consistently reach the desired discharge consent level of about 2000 mg/L COD or less from the first run. Liquid inoculated bioreactors do not get below 4000 mg/L COD even on the third run and the liquid inoculated bioreactors had an extended contact time of 15 days (from 15-30 days in FIG. 7).

Figure 8:
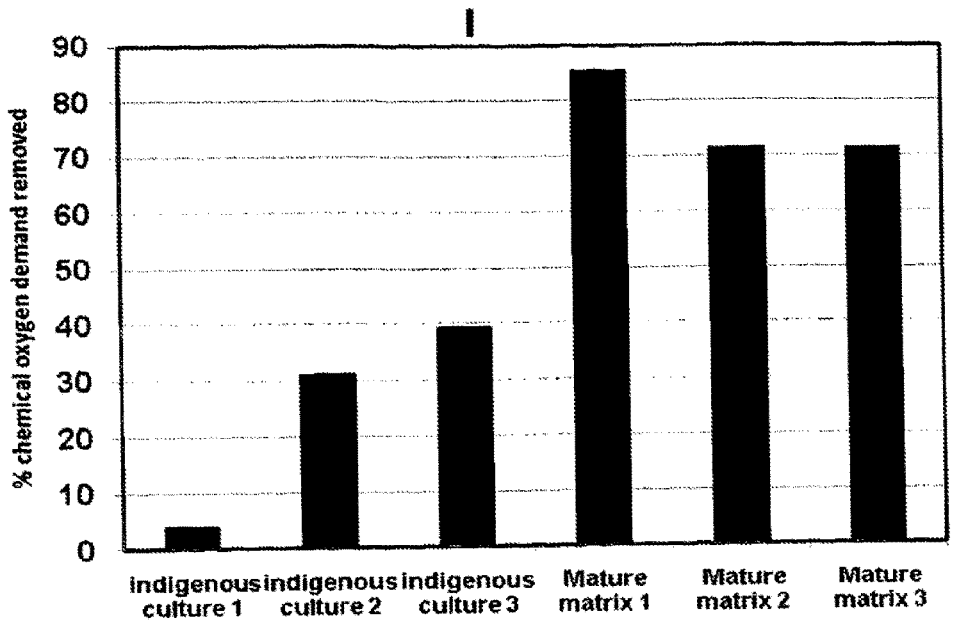
FIG. 8 illustrates the reduction in COD demand during a 12 hour trial using three repeats of the solid matrix inoculation method of the present invention and comparing this to three repeats of the liquid inoculation method of the prior art.

FIG. 8 illustrates that the reduction in COD content of liquid inoculated bioreactors that is achievable in a 12 hour period is much less than the matrix inoculated bioreactors.

Figure 9:
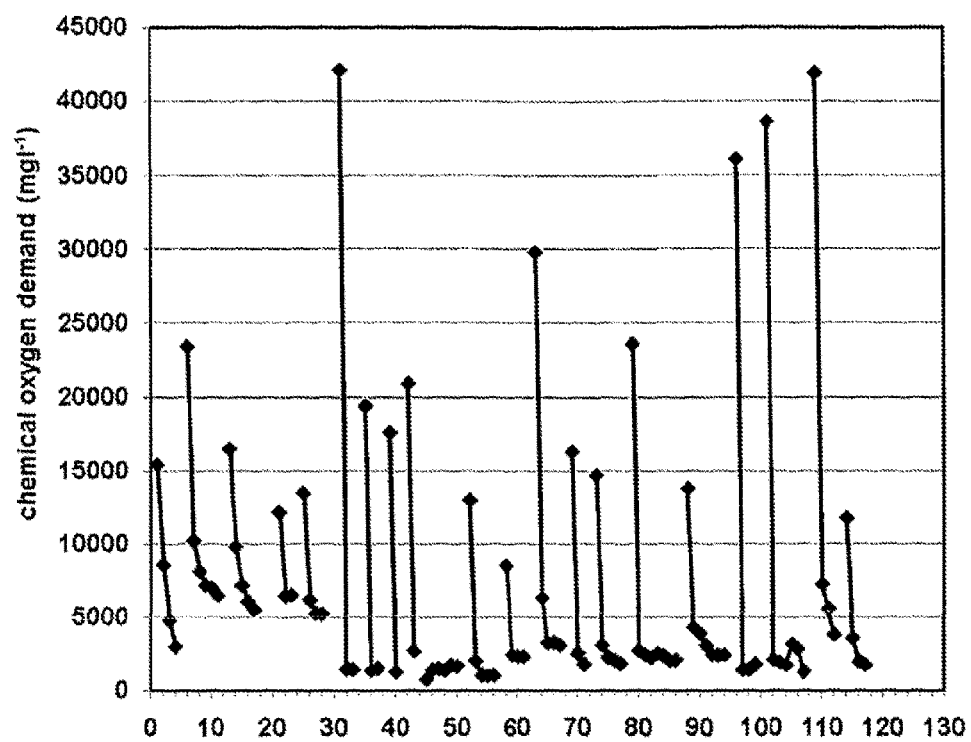
FIG. 9 shows the reduction in COD obtained when commissioning a bioreactor comprising clean solid matrix using effluent from a mature bioreactor.

Example 9—Commissioning a Reactor with Effluent Obtained from a Reactor Containing Mature Matrix Commissioning is carried out using effluent (that is treated spent MWF) from a bioreactor comprising mature solid matrix. The effluent is added to a bioreactor comprising clean solid matrix by diluting MWF (HOCUT 3280 and Houghton 795b) to 10%, 20%, 10%, 10% and 10% for five batch runs (see FIG. 9). The % figure refers to the proportion of MWF in a mixture of MWF and treated effluent. Dilution can be carried out in situ in the bioreactor or can be carried out in a separate tank prior to transferring to the bioreactor. Bioreactors were 1.5 liter aerobic bubble-column bioreactors and contained solid support matrix. The first run also received the biomass from 3 liters of effluent concentrated by centrifugation.

For run 6 onwards, operationally exhausted MWF was treated from a variety of sources. The proportion of MWF in the influent waste stream ranged from 6-100% with 100% indicating no dilution of the MWF.

From day 30 consistent performances were observed and typical sewer consent limits of <2000 mg/l COD were reached.

Further changes can be made within the scope of the invention. For example, the initial community can be created by carefully controlling the MWFs and other materials to which it is exposed during cultivation.

Further aspects of the present invention are set forth below in numbered paragraphs 1. A method of treating a MWF, comprising: establishing a dynamic community of microorganisms in a reactor, the microorganisms being obtained from an existing, viable community established in a liquid containing MWF; contacting the MWF with the community of microorganisms in the reactor; and allowing the dynamic microorganism community to metabolise the MWF so as to reduce its chemical oxygen demand; wherein the membership of the community is allowed to develop during the treatment process in response to changes in the fluid being treated.
2. A method according to paragraph 1, wherein the step of establishing the community comprises cultivating a starter community of microorganisms in a MWF environment by inoculating the MWF environment with microorganisms that are capable of metabolising MFWs and have been derived from MWFs.
3. A method according to paragraph 2, wherein the starter community of microorganisms comprises a consortium of selected microorganisms.
4. A method according to paragraph 2, wherein the starter community of microorganisms comprises an indigenous community of microorganisms isolated from MWFs.
5. A method according to any preceding paragraph, comprising providing the MWF in a unprocessed form prior to contact with the dynamic community of the microorganisms.
6. A method according to any preceding paragraph, comprising providing the MWF in a form having a starting COD of less than 50000 mg/L prior to contact with the dynamic community of microorganisms.
7. A method according to any preceding paragraph, wherein the dynamic community of microorganisms is provided in the form of a biofilm on a solid support matrix.
8. A method according to paragraph 7, comprising the steps of providing a biofilm on a solid support matrix, and positioning the solid support matrix in the reactor.
9. A method according to any preceding paragraph 7, further comprising taking a sample of the biofilm and transferring the sample to a second reactor to establish a dynamic community in the second reactor.
10. A method according to any preceding paragraph, wherein the MWF is maintained in contact with the dynamic community until the chemical oxygen demand is no greater than 2000 mg/L.
11. A method according to any preceding paragraph, wherein the MWF has a residence time in the reactor dependant on the starting COD, the temperature of the MWF, the nature of the components in the MWF, and/or the size of the reactor.
12. A method according to any preceding paragraph, wherein the reactor comprises a vessel in which a batch of MWF is treated until the chemical oxygen demand reaches a predetermined level.
13. A method a according to any of paragraphs 1 to 11, wherein the reactor comprises a series of vessels through which a stream of MWF passes.
14. A dynamic community of microorganism for treating a MWF when obtained from a method according to any preceding claim.

Any publication cited or described herein provides relevant information disclosed prior to the filing date of the present application. Statements herein are not to be construed as an admission that the inventors are not entitled to antedate such disclosures. All publications mentioned in the above specification are herein incorporated by reference. Various modifications and variations of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in microbiology and bioremediation or related fields are intended to be within the scope of the following claims.

The invention claimed is:

1. A method for treating spent metal working fluid (MWF) by reducing chemical oxygen demand (COD) content in the MWF, comprising the steps of:
    (a) providing a mature biofilm of microorganisms on a solid support matrix in a first bioreactor, wherein the mature biofilm is capable of reducing the chemical oxygen demand (COD) of spent MWF to 2000 mg/L or less in 30 days or less;
    (b) transferring the solid support matrix comprising the mature biofilm of microorganisms from the first bioreactor into a second bioreactor;
    (c) incubating the second solid support matrix comprising the mature biofilm of microorganisms from step (b) in the second bioreactor to reduce the chemical oxygen demand (COD) of a diluted spent MWF contained therein; and
    (d) increasing the concentration of the diluted spent MWF obtained in step (c) so as to increase the chemical oxygen demand (COD) of the fluid contained in the second bioreactor.

2. The method according to claim 1, wherein the mature biofilm of microorganisms on the solid support matrix is capable of reducing the COD of spent MWF to 2000 mg/L or less prior to being transferred to the second bioreactor.

3. The method according to claim 1, wherein the volume of the first solid support matrix comprising the mature biofilm of microorganisms that is transferred from the first bioreactor into the second bioreactor in step (b) is at least about 10% of the volume of the second bioreactor.

4. The method according to claim 3, wherein the remaining volume of the second bioreactor is occupied by a solid support matrix upon which a biofilm of microorganisms is not or is not substantially present.

5. The method according to claim 1, wherein the second bioreactor is initially filled either before or after step (b) with spent MWF, suitably, diluted spent MWF, in which the COD thereof is between about 5,000 to about 10,000 mg/L.

6. The method according to claim 1, wherein the solid support matrix comprises, consists or consists essentially of woven tubes of plastic.

7. The method according to claim 1, wherein air flow in the first and/or the second bioreactor is between about 250 to 300 liters per minute per 5000 liters of liquid bioreactor volume at a temperature from about 1 to 35° C.

8. The method according to claim 1, wherein the mature biofilm that is established in step (a) is: (i) derived from an indigenous community of microorganisms isolated from MWF; or (ii) a biofilm derived from a different bioreactor which has been inoculated by transferring at least a portion of a solid support matrix comprising a mature biofilm of microorganisms, and wherein said bioreactor is able to reduce the COD of spent MWF to 2000 mg/L.

9. The method according claim 1, wherein at least a portion of the spent MWF from the second bioreactor is used to inoculate one or more further bioreactors, optionally wherein the further bioreactor(s) comprise a solid support matrix which is not substantially colonised by microorganisms.

10. The method according to claim 9, where said step is repeated one or more times to inoculate one or more further bioreactors.

11. A method for preparing a biofilm of microorganisms that is capable of reducing the COD content of spent MWF comprising the steps of:
  (a) providing a mature biofilm of microorganisms on a solid support matrix in a first bioreactor, wherein the mature biofilm is capable of reducing the chemical oxygen demand (COD) of spent MWF to 3000 mg/L or less in 30 days or less;
  (b) transferring the solid support matrix comprising the mature biofilm of microorganisms from the first bioreactor into a second bioreactor;
  (c) culturing the biofilm of microorganisms in the second bioreactor in the presence of a diluted spent MWF; and
  (d) increasing the concentration of the diluted spent MWF obtained in step (c) so as to increase the chemical oxygen demand of the fluid contained in the second bioreactor.

12. A method for treating spent metal working fluid (MWF), comprising the steps of:
  (a) providing a mature biofilm of microorganisms on a solid support matrix in a first bioreactor, wherein the mature biofilm is capable of reducing the chemical oxygen demand (COD) of spent MWF to 2000 mg/L or less in 30 days or less;
  (b) transferring the solid support matrix comprising the mature biofilm of microorganisms from the first bioreactor into a second bioreactor;
  (c) incubating the second solid support matrix comprising the mature biofilm of microorganisms from step (b) in the second bioreactor to reduce the chemical oxygen demand of a diluted MWF contained therein; and
  (d) increasing the concentration of the diluted spent MWF obtained in step (c) so as to increase the chemical oxygen demand of the fluid contained in the second bioreactor.

13. A method of maturing a bioreactor for treating spent metal working fluid (MWF), the method comprising
  a) inoculating the bioreactor by solid matrix inoculation with a biofilm of two or more species of microorganisms on a solid support matrix, the biofilm having matured in and been transferred from a different bioreactor and is capable of reducing the chemical oxygen demand (COD) of spent MWF, and
  b) incubating with diluted spent MWF, and
  c) incubating with diluted spent MWF obtained in step (b) of increasing concentration so as to increase the COD of the fluid contained in the bioreactor,
  thereby maturing the bioreactor within about 30 days or less.

14. The method of claim 13, wherein the volume of solid support matrix with biofilm transferred into the bioreactor is at least 10%, 15% or 20% or more of the volume of the bioreactor.

15. The method of claim 13, wherein the solid support matrix comprises woven tubes of plastic.

16. The method of claim 13, wherein the biofilm is capable of reducing the COD content of spent MWF to about 2000 mg/L or less.

17. The method of claim 13, wherein maturing the bioreactor occurs at from about 12° C. to about 20° C.

18. The method of claim 13, wherein the bioreactor is aerated following inoculation.

* * * * *